(12) United States Patent
Ohkuma

(10) Patent No.: US 8,878,497 B2
(45) Date of Patent: Nov. 4, 2014

(54) IMAGE PROCESSING APPARATUS

(75) Inventor: Takafumi Ohkuma, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 412 days.

(21) Appl. No.: 13/450,921

(22) Filed: Apr. 19, 2012

(65) Prior Publication Data

US 2012/0274269 A1    Nov. 1, 2012

(30) Foreign Application Priority Data

Apr. 26, 2011    (JP) .................. 2011-098815

(51) Int. Cl.
| | |
|---|---|
| *H02J 7/04* | (2006.01) |
| *H01H 37/00* | (2006.01) |
| *H01M 10/44* | (2006.01) |
| *H01M 10/48* | (2006.01) |
| *H01M 10/46* | (2006.01) |
| *H04N 5/225* | (2006.01) |
| *H04N 101/00* | (2006.01) |

(52) U.S. Cl.
CPC ............. *H02J 7/047* (2013.01); *H04N 5/225* (2013.01); *H01M 10/443* (2013.01); *H01M 10/486* (2013.01); *H01M 10/46* (2013.01); *H04N 2101/00* (2013.01); *H01M 10/448* (2013.01); *H01M 2220/30* (2013.01); *H01M 10/48* (2013.01)
USPC ............................. 320/154; 320/150; 307/117

(58) Field of Classification Search
USPC ................... 320/150, 154; 307/112, 116, 117
See application file for complete search history.

(56) References Cited

U.S. PATENT DOCUMENTS

| 5,684,384 | A  | * | 11/1997 | Barkat et al. ................ 307/66 |
| 7,550,950 | B2 | * | 6/2009  | Tsubaki et al. .............. 320/150 |
| 7,592,778 | B2 | * | 9/2009  | Ooshita et al. .............. 320/150 |
| 7,710,078 | B2 | * | 5/2010  | Miller ......................... 320/150 |
| 7,791,316 | B2 | * | 9/2010  | Grunert et al. ............... 320/138 |

FOREIGN PATENT DOCUMENTS

| JP | 05-176474   | 7/1993  |
| JP | 2009-272134 | 11/2009 |

OTHER PUBLICATIONS

U.S. Appl. No. 13/369,453, filed Feb. 9, 2012, Takafumi Okuma.

* cited by examiner

*Primary Examiner* — Richard V Muralidar
(74) *Attorney, Agent, or Firm* — Oblon, Spivak, McClelland, Maier & Neustadt, L.L.P.

(57) ABSTRACT

An image processing apparatus, including: a rechargeable battery that includes a temperature detecting terminal from which temperature status of the rechargeable battery is obtained; a connector that supplies electric power to charge the rechargeable battery; a battery charge unit that controls the electric power and charges the rechargeable battery via the connector; a control unit that controls the battery charge unit and operation of the image processing apparatus; and a switch unit that switches a connection of the temperature detecting terminal among the battery charge unit and the control unit.

12 Claims, 3 Drawing Sheets

IMAGE PROCESSING APPARATUS

CROSS-REFERENCE TO RELATED APPLICATIONS

The present application claims priority to and incorporates by reference the entire contents of Japanese Patent Application No. 2011-098815 filed in Japan on Apr. 26, 2011.

BACKGROUND

1. Technological Field

The exemplary embodiments described herein relate to an image processing apparatus. In particular, the image processing apparatus may carry a rechargeable battery which has a temperature detecting terminal that outputs a temperature state.

2. Description of the Related Art

In recent years, the rechargeable battery is frequently used for portable devices, such as a digital camera, as the built-in power supply. A charging circuit may be within the portable device for charging the rechargeable battery.

In this case, the USB port of a personal computer (PC) or an AC/DC adaptor (including output of USE port) are used to supply power to the charging circuit. Temperature detection of the rechargeable battery is carried out by the resistance change of the thermistor in the rechargeable battery.

Japanese laid open patent 2009-272134 describes that the authentication system tests a rechargeable battery by using a common terminal with a temperature sensor and an identifier (ID) authentication chip.

The rechargeable battery includes a power supply terminal and the common terminal. A charger detects the temperature of the rechargeable battery by using the temperature sensor inside the battery pack, and tests the rechargeable battery based on the ID authentication chip. In the rechargeable battery, the temperature sensor is connected between the common terminal and the power supply terminal and the ID authentication chip is connected to the common terminal parallel to the temperature sensor. In the ID authentication chip, when a pulse input detector circuit detects a pulse of authentication, a switching control circuit turns on a switch and the ID authentication circuit is connected to the common terminal. After authentication operation is completed, the switching control circuit turns off the switch and the ID authentication circuit is disconnected from the common terminal. The authentication system does not affect a measurement and is low cost.

Japanese laid open patent 1993-176474 describes that a fault charge control circuit at the time of charging a rechargeable battery is included within the apparatus. The fault charge control circuit lessens influence by ambient temperature or charge voltage in case of the rechargeable battery and prevents a continued fault charge. A constant current circuit provides a charge current to the rechargeable battery. The constant current circuit includes—delta V detection circuit which detects a voltage drop (delta V) of the rechargeable battery at the last stage of charge. The apparatus includes a thermistor which outputs a temperature voltage value corresponding to the temperature of the rechargeable battery, a reference voltage output circuit which outputs a reference voltage corresponding to the temperature of the battery at the time of fault charge and a comparator which compares the temperature voltage value with the reference voltage. When the temperature voltage value is equal to or more than the reference voltage, a current supply circuit of an external charger is turned off.

However, when the conventional image processing apparatus mentioned above monitors the thermistor in a lithium ion battery, according to a charging circuit to be selected, the difference of the control voltage range of the charging IC (integrated circuit) and CPU, the image processing apparatus needs to choose either (a) or (b): (a) pull up voltage of the thermistor is unified; or (b) the thermistor is monitored only by the CPU, and a charging circuit is controlled by serial communication according to the temperature detected by the thermistor.

In case of (a), it is necessary to make equivalent the REF voltage range of charging IC, and the range of detection of the CPU. Further, the pull up voltage is always stabilized and needs to be supplied.

These necessities are big restrictions when the charging IC is chosen and a charging circuit is constituted.

In case of (b), in order to always start the CPU, electric power at certain grade must be supplied.

An Electric power required for the CPU driving might be unable to be provided by the USB port before enumeration which could provide 5V/100 mA. In that case, although it is possible to supply from a battery, it cannot be supplied by the battery in a fault discharge state (i.e., battery discharged too much). When the battery was a rechargeable battery, there was a problem that the temperature could not be detected from the thermistor of the rechargeable battery and proper charge control could not be performed.

As mentioned above, Japanese laid open patent 2009-272134 describes that the purpose is to have a common terminal with battery authentication signal and temperature sensor of the rechargeable battery.

However, Japanese laid open patent 2009-272134 does not disclose a problem that if the power consumption of a system is large when the capability of a charge power supply block is restricted, the system cannot read the value of a thermistor appropriately, and the system cannot carry out charge control.

SUMMARY

In a first exemplary embodiment, an image processing apparatus includes: a rechargeable battery that includes a temperature detecting terminal from which temperature status of the rechargeable battery is obtained; a connector that supplies electric power to charge the rechargeable battery; a battery charge unit that controls the electric power and charges the rechargeable battery via the connector; a control unit that controls the battery charge unit and operation of the image processing apparatus; and a switch unit that switches a connection of the temperature detecting terminal among the battery charge unit and the control unit, wherein the control unit controls the switch unit such that the temperature detecting terminal is connected with the battery charge unit in case of charging the rechargeable battery and the temperature detecting terminal is connected with the control unit in case of an image processing operation.

According to an exemplary embodiment, by monitoring temperature information of the rechargeable battery, proper charge operation can be performed and proper operation of the image processing apparatus can be performed.

According to an exemplary embodiment, a method includes: controlling, with a control unit, a switch unit in an image processing apparatus that switches a connection of a temperature detecting terminal of a rechargeable battery among a battery charge unit that charges the rechargeable battery in the image processing apparatus and a control unit that controls the battery charge unit and operation of the image processing apparatus, wherein the controlling includes controlling the switch unit to connect the temperature detecting terminal with the battery charge unit in case of charging the rechargeable battery and controlling the switch unit to connect the temperature detecting terminal with the control unit in case of an image processing operation.

DETAILED DESCRIPTION

The image processing apparatus (an image recorder is included) in an exemplary embodiment has a circuit which separates the thermistor detection function at the time of performing charge operation and the thermistor detection function at the time of the portable apparatus operation. The circuit changes the connection place of the terminal of the thermistor of the rechargeable battery. For example, this exemplary embodiment uses an analog switch with low resistance. This circuit can be realized without adding a large circuit element as compared with the conventional technology.

Figure 1:
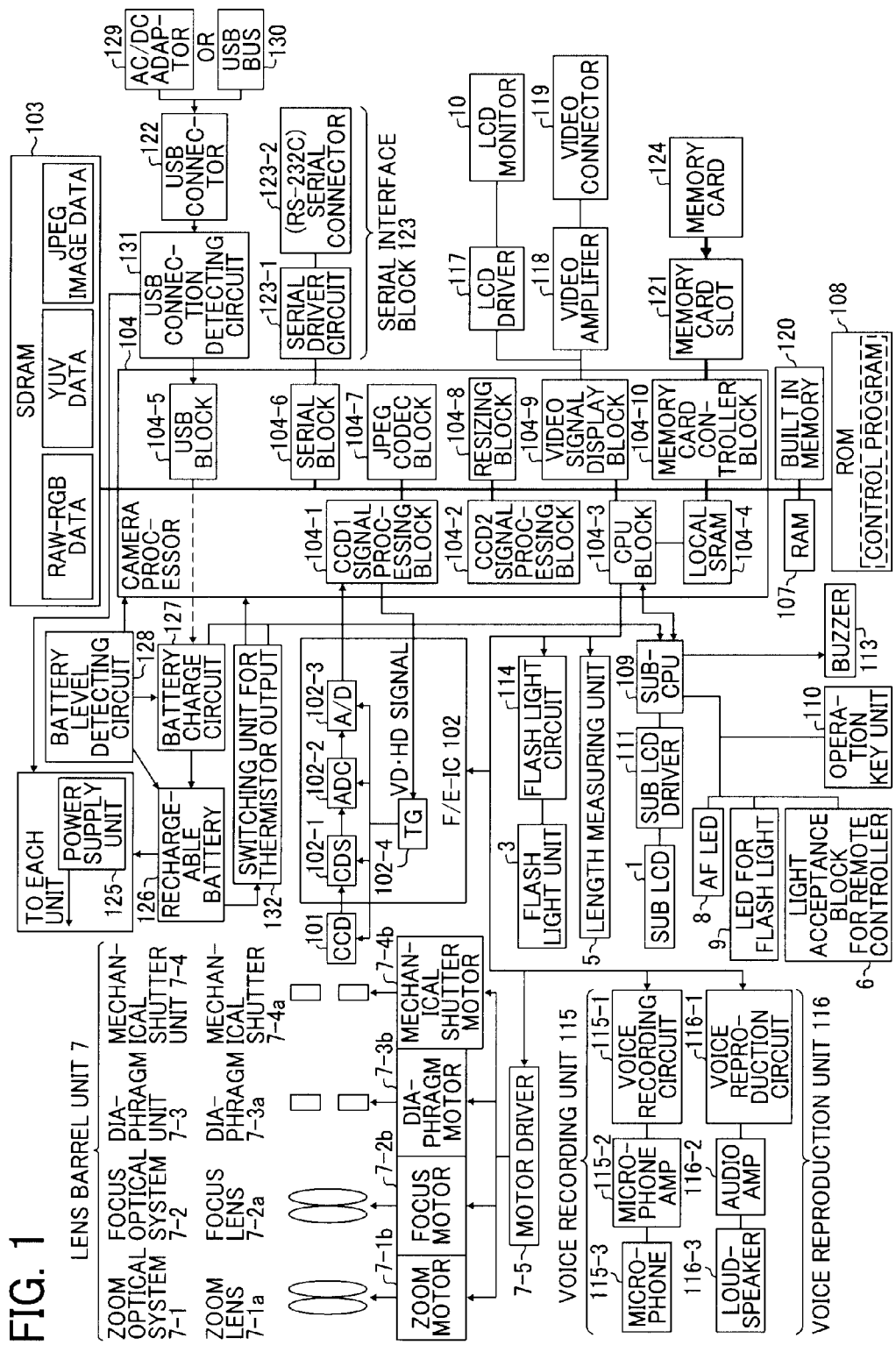
FIG. 1 is a block diagram illustrating an image processing apparatus corresponding to an exemplary embodiment.

FIG. 1 is a block diagram illustrating an image processing apparatus corresponding to an exemplary embodiment.

The image processing apparatus may be a portable digital camera, for example. While an image processing apparatus is discussed herein, features of the image processing apparatus may be applicable to other battery operated devices, such as laptop computers, tablets, and mobile communication devices. The image processing apparatus comprises a rechargeable battery 126 to drive the digital camera, a power supply unit 125, a battery charge circuit 127 to charge the rechargeable battery 126, a battery level detecting circuit 128 to detect the voltage level of the rechargeable battery 126, an AC/DC adaptor 129 (or a USB BUS 130 in personal computer), a USB connection detecting circuit 131 and switching unit for thermistor output 132. The power supply unit 125 generates a certain voltage for each unit in the digital camera. The AC/DC adaptor 129 (or the USB BUS 130 in personal computer) provides a charge current to the battery charge circuit 127. The USB connection detecting circuit 131 detects USB BUS connection.

Further, the image processing apparatus comprises a sub LCD 1, a length measuring unit 5, a light acceptance block for remote controller 6, a lens barrel 7, an LED for AF display 8, an LED for flash light display 9, an LCD monitor 10, a CCD (image device) 101, a front end block 102, an SDRAM 103, a camera processor 104, a RAM 107, a ROM 108, a sub CPU 109, an operation key unit 110, a sub LCD driver 111, a buzzer 113, a flash light circuit 114, a voice recording unit 115, a voice reproduction unit 116, an LCD driver 117, a video amplifier 118, a video connector 119, a built-in memory 120, a memory card slot 121, a USB connector 122, a serial interface block 123.

The function of each component of the present embodiment is described referring to FIG. 1.

The USB connector 122 of the image processing apparatus has four output terminals, which are the VBUS line which has the power supply voltage (5V), the GND line used as the ground earth, D+ terminal as a data line and D− terminal as a data line.

The USB connection detecting circuit 131 detects that the battery charge circuit 127 connects to either the AC/DC adaptor 129 or the USB BUS 130 thorough the USB connector 122.

The USB connection detecting circuit 131 detects the D+ and D− after the VBUS line connects to V-BUS of the USB connector 122.

According to the detection result, the upper limit of charge current of the battery charge circuit 127 is decided and the battery charge circuit 127 supplies current to the rechargeable battery 126.

The battery level detecting circuit 128 detects voltage level of the rechargeable battery 126 and transmits the voltage level to the sub CPU 109 as information to allow starting the basic operation of the digital camera.

The digital camera may be configured to start basic operation if the voltage level is above a predetermined threshold.

The sub CPU 109 switches the output of thermistor in the rechargeable battery 126 by the switching unit for thermistor output 132 based on the voltage level or what the USB connector 122 is connected to.

The function of each component of the present embodiment is described below.

The lens barrel 7 includes a zoom optical system 7-1, a focus optical system 7-2, an aperture diaphragm unit 7-3, a mechanical shutter unit 7-4 and a motor driver 7-5. The zoom optical system 7-1 comprises a zoom lens system 7-1a which captures an image of the object and a zoom motor 7-1b. The focus optical system comprises a focus lens system 7-2a and a focus motor 7-2b. The aperture diaphragm unit 7-3 comprises a diaphragm 7-3a and a diaphragm motor 7-3b. The mechanical shutter unit 7-4 comprises a mechanical shutter 7-4a and a mechanical shutter motor 7-4b. The motor driver 7-5 controls the motors above.

The front end block (F/E-IC) 102 includes a CDS 102-1 which performs correlated double sampling (CDS), an AGC (auto gain control) 102-2, an A/D (analog to digital) conversion block 102-3 and a TG (timing generator) 102-4.

The camera processor 104 includes a CCD1 signal processing block 104-1, a CCD2 signal processing block 104-2, a CPU block 104-3, a local SRAM 104-4, a USB block 104-5, a serial block 104-6, a JPEG CODEC block 104-7, a resizing block 104-8, a video signal display block 104-9 and a memory card controller block 104-10. The CCD1 signal processing block 104-1 performs white balance setting and gamma setting to the output of F/E-IC 102 and provides VD signal and HD signal. The CCD2 signal processing block 104-2 converts brightness data and hue data by applying a filtering process. The CPU block 104-3 controls each part of the apparatus. The local SRAM 104-4 save data which is necessary for the CPU block 104-3 to control temporally. The USB block 104-5 performs USB communication with an external device such as personal computer. The serial block 104-6 performs serial communication with an external device. The JPEG CODEC block 104-7 performs encoding and decoding of JPEG format. The resizing block 104-8 enlarges or reduces the size of the image data by interpolating or extrapolating. The video signal display block 104-9 converts the image data to a video signal to display with an external display device such as TV or LCD display. The memory card controller block 104-10 controls a memory card which saves the image data.

The operation key unit 110 includes a release button, a mode dial, a zoom button, a power switch and an operation key unit (which are not shown in figure).

The voice recording unit 115 includes a voice recording circuit 115-1, a microphone amplifier 115-2 and a microphone 115-3. The voice reproduction unit 116 includes a voice reproduction circuit 116-1, an audio amplifier 116-2 and a loudspeaker 116-3. The serial interface block 123 includes a serial driver circuit 123-1 and a serial connector 123-2.

The sub LCD 1, the release button and the mode dial are disposed on the top surface of the digital camera, generally. The sub LCD 1 as a display block displays a number to be able to photograph, for example. A flash light unit 3, the length measuring unit 5, a light acceptance block for remote controller 6 and an optical finder (front surface) are disposed on the front surface of the digital camera.

A memory card loading unit which loads the memory card 124 is disposed on the side surface of the digital camera. The memory card slot 121 is disposed inside the memory card loading unit. The memory card 124 is inserted to the memory card slot 121. The LED for AF display 8, the LED for flash light display 9, the LCD monitor 10, the optical finder (rear surface), the zoom button, the power switch and the operation key unit are disposed on the rear surface of the digital camera.

Figure 2:
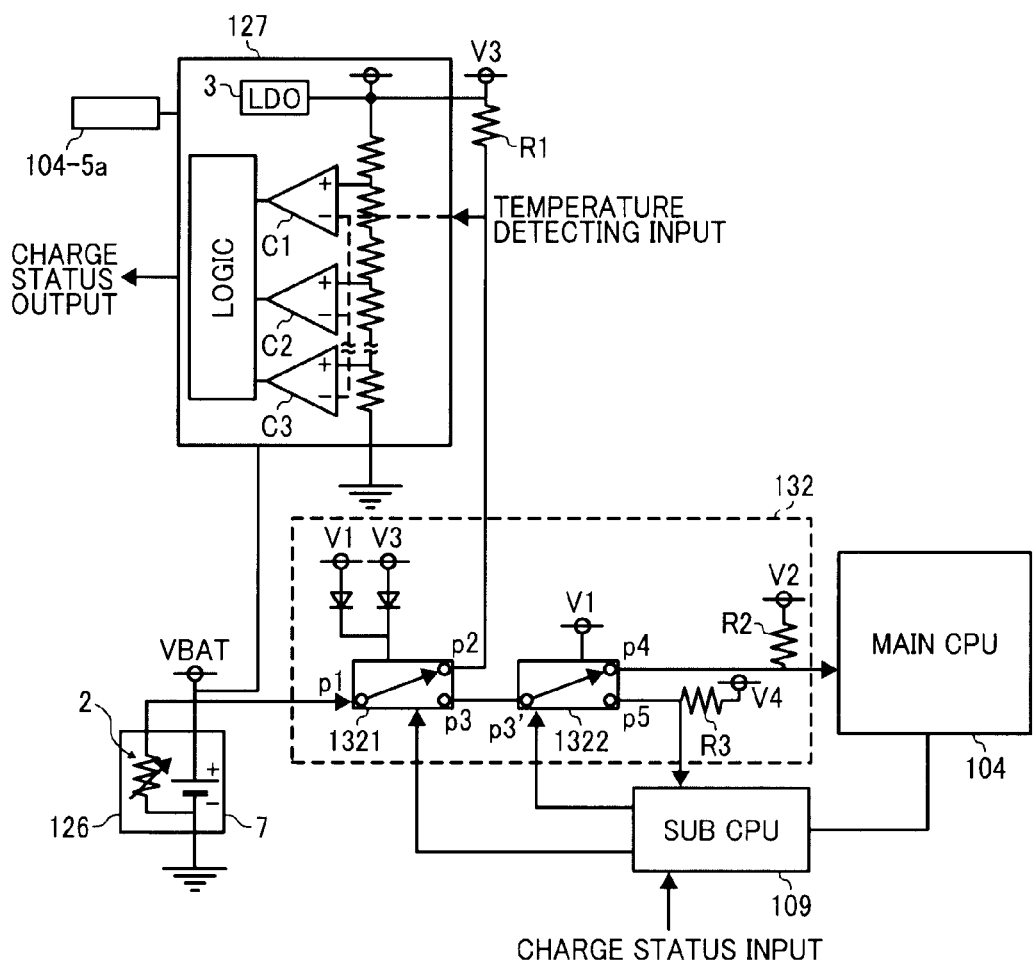
FIG. 2 is a schematic circuit illustrating a switching block for an output of thermistor corresponding to an exemplary embodiment.

Next, the operation of the digital camera is described referring to FIG. 1 and FIG. 2. The flash light unit 3 and the flash light circuit 114 makes up for amount of light when light volume, such as available light in an object, is insufficient. When available light is insufficient or taking a picture in the dark place, the camera processor 104 transmits a flash light signal to the flash light circuit 114. The flash light circuit 114 makes the flash light unit 3 flash (i.e., emit light), and the object is flashed. The length measuring unit 5 measures a length between the digital camera and the object. This kind of digital camera uses what is called a CCD-AF method as auto focusing (AF). In the CCD-AF method, the contrast information on the object image imaged by the CCD 101 is detected by the optical system of the lens barrel 7. The focus lens system 7-2a is moved to the position where a contrast value is the highest. In case the CCD-AF method, the focus lens system 7-2a is moved little by little and the contrast value is calculate at each position. Therefore, its focusing operation is slow. Then, the length measuring unit 5 always acquires distance information of the object. Based on the distance information, the focus lens system 7-2a is moved near the position corresponding to the distance information.

The lens barrel 7 includes a zoom optical system 7-1, a focus optical system 7-2, an aperture diaphragm unit 7-3, a mechanical shutter unit 7-4 and a motor driver 7-5. The zoom optical system 7-1 comprises a zoom lens system 7-1a which captures an image of the object and changes a focal length and a zoom motor 7-1b which moves the zoom lens system 7-1a. The focus optical system comprises a focus lens system 7-2a which changes degree of focus and a focus motor 7-2b which moves the focus lens system 7-2a. The aperture diaphragm unit 7-3 comprises a diaphragm 7-3a which adjusts stop of a diaphragm and a diaphragm motor 7-3b which drive the diaphragm. The mechanical shutter unit 7-4 comprises a mechanical shutter 7-4a which includes a mechanical shutter opens/closes optical path of the lens barrel 7 and a mechanical shutter motor 7-4b which drives the mechanical shutter. The motor driver 7-5 controls the motors of above mentioned 7-1b, 7-2b, 7-3b and 7-4b. A CPU block 104-3 in the camera processor 104 transmits signals and controls the motor driver 7-5 according to inputs from the light acceptance block for remote controller 6 or from the operation key unit 110.

The ROM 108 stores a control program and a control parameter etc., which were described in program code decipherable by the CPU block 104-3. When the power switch of the operation key unit 110 is turned on, the digital camera is in an ON state. The control program is loaded to the main memory in which is included the CPU block 104-3 (not illustrated). The CPU block 104-3 controls operation of each part of the digital camera according to the control program. The CPU block 104-3 saves data required for control etc. in the RAM 107 and local SRAM 104-4 in the camera processor 104.

If the ROM 108 is used as rewritable flash memory, it is possible to change a control program, a control parameter, etc. The function of a digital camera is easily upgradable.

Typically, the CCD 101 is used the solid-state image sensing device of CCD (Charge Coupled Device) or CMOS (Complementary Metal Oxide Semiconductor), changes an optical image into an electric signal, and changes it into an electronic image signal.

The front end block (F/E-IC) 102 includes the CDS 102-1, the AGC 102-2, the A/D conversion block 102-3 and the TG 102-4. Each part of the front end block 102 is controlled by the CPU block 104-3 in the camera processor 104.

The CDS 102-1 performs correlated double sampling and noise cancelling on the image signal from CCD 101. The AGC 102-2 performs gain control on the image signal from CDS 102-1. The A/D conversion block 102-3 performs analog to digital conversion on the image data from the AGC 102-2 and transmits to a CCD1 signal processing block 104-1.

The TG 102-4 controls signal-processing operation of the CDS102-1, the AGC102-2 and the A/D conversion block 102-3 by VD signal and HD signal output from the CCD1 signal processing block 104-1. The TG 102-4 gives a drive timing signal to the CDS 102-1, the AGC102-2, the A/D conversion block 102-3 and the CCD 101 synchronizing with the VD signal and the HD signal.

As for the front end block 102, it is desirable to mount the CDS 102-1, the AGC 102-2, the A/D conversion block 102-3 and the TG 102-4 on same IC (integrated circuit) chip. Alternatively, the CDS 102-1, the AGC 102-2, the A/D conversion block 102-3 and the TG 102-4 may be on separate IC chips.

The CCD1 signal processing block 104-1 in the camera processor 104 provides the VD signal and the HD signal to the TG 102-4 in the front end block 102. The CCD1 signal processing block 104-1 performs signal processing such as white balance adjustment and gamma adjustment on the digital image signal from the A/D conversion block 102-3. The CCD2 signal processing block 104-2 performs filter processing and converts RAW-RGB data to brightness data and hue data, which is YUV (YCbCr) data.

The CPU block 104-3 of the camera processor 104 controls the operation of each part inside of the digital camera. The Local SRAM 104-4 of the camera processor 104 saves data required for control by the CPU block 104-3 etc., temporarily.

The USB block 104-5 performs USB communication with an external device, such as personal computer, based on the USB specification. The serial block 104-6 performs serial communication with an external device based on RS-232C, for example. The JPEG CODEC block 104-7 performs encoding and decoding of JPEG format. The resizing block 104-8 enlarges or reduces the size of the image data by interpolating or extrapolating. The video signal display block 104-9 converts the image data to a video signal to display with an external display device such as TV or LCD display. The memory card controller block 104-10 controls a memory card (LAN card, WiFi LAN card, Bluetooth card etc.) which saves the image data and write/read-out the image data for reproducing.

The SDRAM 103 saves the image data temporarily when the camera processor 104 performs various kinds of processing to the image data.

The image data which is saved temporarily in the SDRAM 103 are RAW-RGB data, YUV data (YCbCr) and JPEG image data for example. The RAW-RGB data is generated by processing white balance adjustment and gamma adjustment to image data through the front end block 102 by the CCD1 signal processing block 104-1. The YUV data is generated by processing conversion to brightness data (Y) and hue data ([U(Cb), V(Cr)]) by the CCD1 signal processing block 104-2. The JPEG image data is generated by the JPEG CODEC block 104-7.

The memory card slot 121 is a connector slot for loading the memory card 124, which saves the image data, so that attachment and detachment are possible. Write/read-out control of the memory card 124 is performed by memory card controller Brock 104-10 through the memory card slot 121. The built-in memory 120 is a memory for storing the image data, and even if the memory card 124 is not loaded with the memory card slot 121, it can store the image data.

The LCD driver 117 is a drive circuit which drives the LCD monitor 10 and has the function to change the video signal outputted from the video signal display block 104-9 into the signal for displaying on the LCD monitor 10. The LCD monitor 10 is a monitor for performing the image display which displays an object condition to confirm before photography, the image display which displays the picture to be checked by a user, and the image display displays image data recorded on the memory card 124 or the built-in memory 120.

The video amplifier 118 carries out impedance conversion of the video signal outputted from the video signal display block 104-9 to a 75-ohm impedance output.

The video connector 119 is a connector for connecting the 75-ohm impedance output of the video amplifier 118 to external display apparatus, such as TV.

The USB connector 122 is a connector for making USB connection with an external apparatus, such as PC. The serial interface part 123 includes a serial driver circuit 123-1 and a serial connector 123-2. The serial interface part 123 constitutes the interface for performing serial communication among an external apparatus, such as PC, according to the standardized serial communication standard, for example, a RS-232C etc. The serial driver circuit 123-1 is a circuit which carries out voltage conversion of the output signal from the serial block 104-6. The serial connector 123-2 is a connector for connecting the serial output which voltage conversion is carried out in the serial driver circuit 123-1 to external apparatus, such as PC.

The sub CPU 109 is, for example, a microprocessor which built in ROM and RAM on the same chip. The sub CPU 109 provides the output signal of the operation key unit 110 or the light acceptance block for remote controller 6 to the CPU block 104-3 in the camera processor 104 as an operator's operation information. The sub CPU 109 supplies a control signal to the sub LCD 1, the LED for AF display 8, the LED for flash light display 9 and the buzzer 113 based on the state information of the digital camera outputted from the CPU block 104-3.

The sub LCD 1 is a display for displaying the number of sheets which can be photographed, for example. The sub LCD driver 111 is a circuit which drives the sub LCD 1 based on the output signal of the sub CPU 109. The LED for AF display 8 is an LED for displaying the status of focus when taking a picture. The LED for flash light display 9 is an LED for displaying the flash preparatory state based on a charge state of a capacitor for the flash light circuit 114. The flash light circuit 114 is ready to emit light when the capacitor is sufficiently charged. The digital camera may use the LED to indicate status of the flash light, and the LED may also indicate another state, for example, access of the memory card 124.

The operation key unit 110 includes, for example, an operation key, an operation switch and an operation button, which a user operates. In the present embodiment, the release button, a photography/reproduction switch dial, a zoom button, a power switch and an operation key part are included, for example. The light acceptance block for remote controller 6 accepts light signal, such as infrared light, from remote controller that the user operates (not described in figures).

The voice recording unit 115 includes a voice recording circuit 115-1, a microphone amplifier 115-2 and a microphone 115-3. The microphone amplifier 115-2 amplifies the sound signal input through the microphone 115-3. The voice recording circuit 115-1 records the sound signal amplified through the microphone amplifier 115-2. The voice reproduction unit 116 includes a sound reproduction circuit 116-1, an audio amplifier 116-2 and a loudspeaker 116-3. The voice reproduction circuit 116-1 generates sound signal for reproducing by the loudspeaker 116-3. The audio amplifier 116-2 amplifies the sound signal generated by the voice reproduction circuit 116-1. The loudspeaker 116-3 outputs the sound signal amplified by the audio amplifier 116-2.

The apparatus of the current embodiment may have a Bluetooth circuit (not described in figures) and make wireless connection with another Bluetooth compliant apparatus. If the apparatus of the current embodiment does not have the Bluetooth circuit, a Bluetooth card, which has Bluetooth compliant interface function, can be loaded in the memory card slot 121 and the apparatus can then make a wireless connection with another Bluetooth compliant apparatus. The apparatus of the current embodiment may have an Ethernet connection circuit (not described in figures) or an Ethernet wireless connection circuit (not described in figures) and make an Ethernet connection. If the apparatus of the current embodiment does not have the Ethernet connection circuit, a LAN card or a wireless LAN card can be loaded in the memory card slot 121 and the apparatus can then make an Ethernet connection.

FIG. 2 is a schematic circuit illustrating a switching block for an output of the thermistor and a charge circuit. It is explained that charge operation of the rechargeable battery in the image processing apparatus with referring to FIG. 1 and FIG. 2.

The AC/DC adaptor 129 and the USB BUS 130 of a personal computer or a printer are connected to the USB connector 122. Via the USB connector 122 and the USB connection detecting circuit 131, power is supplied to the battery charge circuit 127 from the USB block 104-5 (power supply connector 104-5a in FIG. 2).

The power source is used to charge the rechargeable battery 126.

The battery charge circuit 127 includes a low dropout regulator (LDO) which outputs the voltage V3 (e.g. between 4.8V and 5V), comparators C1 to C3 which compare voltage, and a logic circuit which outputs charge status according to the output of the comparators. The reference voltage which is generated from the output of the LDO through a resistance is inputted into the plus terminal of each comparator and the output from a thermistor 2 is inputted into the minus terminal of each comparator.

The rechargeable battery 126 includes the thermistor 2 as a temperature detection element which monitors battery temperature. The thermistor 2 has a resistance that varies with temperature. One end of the thermistor 2 is connected with ground and the other end is connected with a temperature detecting terminal of the rechargeable battery 126. The temperature information on the rechargeable battery 126 can be acquired by the voltage of the temperature detecting terminal between the thermistor 2 and the pull up resistance R1. In other words, pull up voltage is applied to the temperature detecting terminal via the pull up resistance. The voltage of the temperature detecting terminal is generated by dividing the pull up voltage between the thermistor 2 and the pull up resistance R1.

In the present embodiment, the sub CPU 109 operates the switch1 1321 and the switch2 1322 in the switching unit for thermistor output 132. The switch1 and the switch2 change what is connected to the temperature detecting terminal of the rechargeable battery 126.

As for the switch1 1321, the terminal p1 is connected with the thermistor, the terminal p2 is connected with the pull up resistance R1 and the terminal p3 is connected with the terminal P3' of the switch2 1322.

The switch1 1321 is controlled by switch control signal 1 from the sub CPU 109. As for the power supply of the switch1 1321, the higher one is chosen among V1 or V3. The V1 is a power supply of the switching unit for thermistor output 132, and may be 3.3V, for example.

As for the switch2 1322, the terminal p3' is connected with the terminal p3 of switch1 1321, the terminal p4 is connected with the pull up resistance R2 and the terminal p5 is connected with the pull up resistance R3.

The power supplies V2 and V4 are connected to the pull up resistances R2 and R3, respectively. The V2 is one of the power supplies of the camera processor 104 and may be, for example, 3V. The V4 is one of the power supplies of the sub CPU 109 and may be, for example, 2.9V.

Here, V1 to V4 have a relationships of V3>V1>V2 and V1>V4. In order to measure the terminal of the thermistor 2, the V1 of the switching unit for thermistor output 132 is higher than the V2 of the camera processor 104 and the V4 of the sub CPU 109.

In case of charging, the sub CPU 109 operates the switch1 1321 and the switch2 1322 of the switching unit for thermistor output 132 so that the temperature detecting terminal is connected with the battery charge circuit 127. The pull up voltage is V3 and the pull up resistance is R1. The voltage of temperature detecting terminal corresponds to V3 being divided by the thermistor 2 and the pull up resistance R1. The path goes from the terminal p1 to the terminal p2 of switch1 1321 shown in FIG. 2.

In case of operation of the image processing apparatus, other than charging, (digital camera in a photo capturing mode, for example) the sub CPU 109 operates the switch1 1321 and the switch2 1322 so that the voltage of the temperature detecting terminal is connected with an A/D convertor (not described in FIG. 2) in the camera processor 104. The pull up voltage is V2 and the pull up resistance is R2. The voltage of temperature detecting terminal corresponds to V2 being divided by the thermistor 2 and the pull up resistance R2. The path goes from the terminal p1, the terminal p3, the terminal p3' to the terminal p4 shown in FIG. 2.

When there is no charging and no operation of the image processing apparatus, the sub CPU 109 operates the switch1 1321 and the switch2 1322 so that the voltage of the temperature detecting terminal is connected to an A/D convertor (not described in FIG. 2) in the sub CPU 109. The pull up voltage is V4 and the pull up resistance is R3. The voltage of temperature detecting terminal corresponds to V4 being divided by the thermistor 2 and the pull up resistance R3. The path goes from the terminal p1, the terminal p3, the terminal p3' to the terminal p5 shown in FIG. 2. The A/D convertor in the sub CPU 109 detects existence of the rechargeable battery 126.

The switch1 1321 and the switch2 1322 may be analog switches. However, any other switches may be used as well.

The switch1 1321 and the switch2 1322 are added on the charging circuit and change connection of the thermistor 2 of the rechargeable battery. Since the charging circuit can be used, relaiability of apparatus is not lost and cost of apparatus may be low.

The battery charge circuit 127 always performs temperature control while charging. Therefore, the temperature control in the camera processor 104 is unnecessary and it is not needed to place this excessive processing burden on the processor 104.

Conventionally, the output of thermistor 2 is connected with both the A/D convertor in the camera processor 4 and the battery charge circuit 127. Therefore, a range and an accuracy of temperature detection voltage become worse because of pull up voltage difference or input impedance of the A/D convertor. To solve this problem, the charging device may be selectively connected to the thermistor 2.

Conventionally, the camera processor 104 acquires the temperature information on the rechargeable battery 126 and performs charge control to a charging device. By this method, since electric power is consumed for the communications between the camera processor 104 and the charging device, charge time will become longer.

The image processing apparatus of present embodiment includes the battery charging circuit 127 and the switching unit for thermistor output 132 (switch1 1321 and switch2 1322). Since the present embodiment provides less processing burden on the camera processor 104, charge time is improved relative the conventional approach. The power supply of the switching unit for thermistor output 132 (V1) always exists; either the rechargeable battery 126 is made into a power source or the VBUS is made into a power source. Irrespective of the state of the rechargeable battery 126, charge operation can always be started. In other words, even if it is a case when the rechargeable battery 126 is fault electric discharge, proper charge can be performed by knowing temperature information correctly.

Specifically, the power source for the switch1 1321 is provided by coupling output of LDO 3 (V3) whose power source is VBUS and output of DC/DC convertor (V1) whose power source is the rechargeable buttery 126 via diodes. In this manner, the power source for the switch1 1321 becomes one of the higher voltage among them.

Especially, in case remaining capacity of the rechargeable battery 126 is low (fault electric discharge state of a battery, etc.), the rechargeable battery 126 has to be charged immediately. At that time, VBUS becomes a power supply and supplies electric power to the sub CPU 109 and the switching unit for thermistor output 132.

Then, even if it is under the situation where there is no control input for the camera processor 104, the sub CPU 109 controls the switching unit for thermistor output 132 and connects the output of a thermistor 2 to the battery charge circuit 127 in order to start charging. When the range of voltage value of the rechargeable battery 126 becomes a range about operation of the camera processor 104, the sub CPU 109 connects the output of the thermistor 2 to the camera processor 104. In other words, since priority is given to charge of the rechargeable battery, the apparatus can be certainly operated with the rechargeable battery charged to some extent.

When the image processing apparatus operates during charging operation, the battery charge circuit 127 detects output of the thermistor 2 and monitors temperature condition. Then, it can be constituted to make the power supply of the apparatus disconnect according to the temperature condition.

In case of no charge operation or no camera operation, the output of the thermistor 2 is connected to the A/D convertor which detects the existence of the rechargeable battery 127 of the sub CPU 109 which has smaller power consumption as compared with the camera processor 4. After detecting, next permitted operation is determined according to VBUS detection or voltage of the battery.

Figure 3:
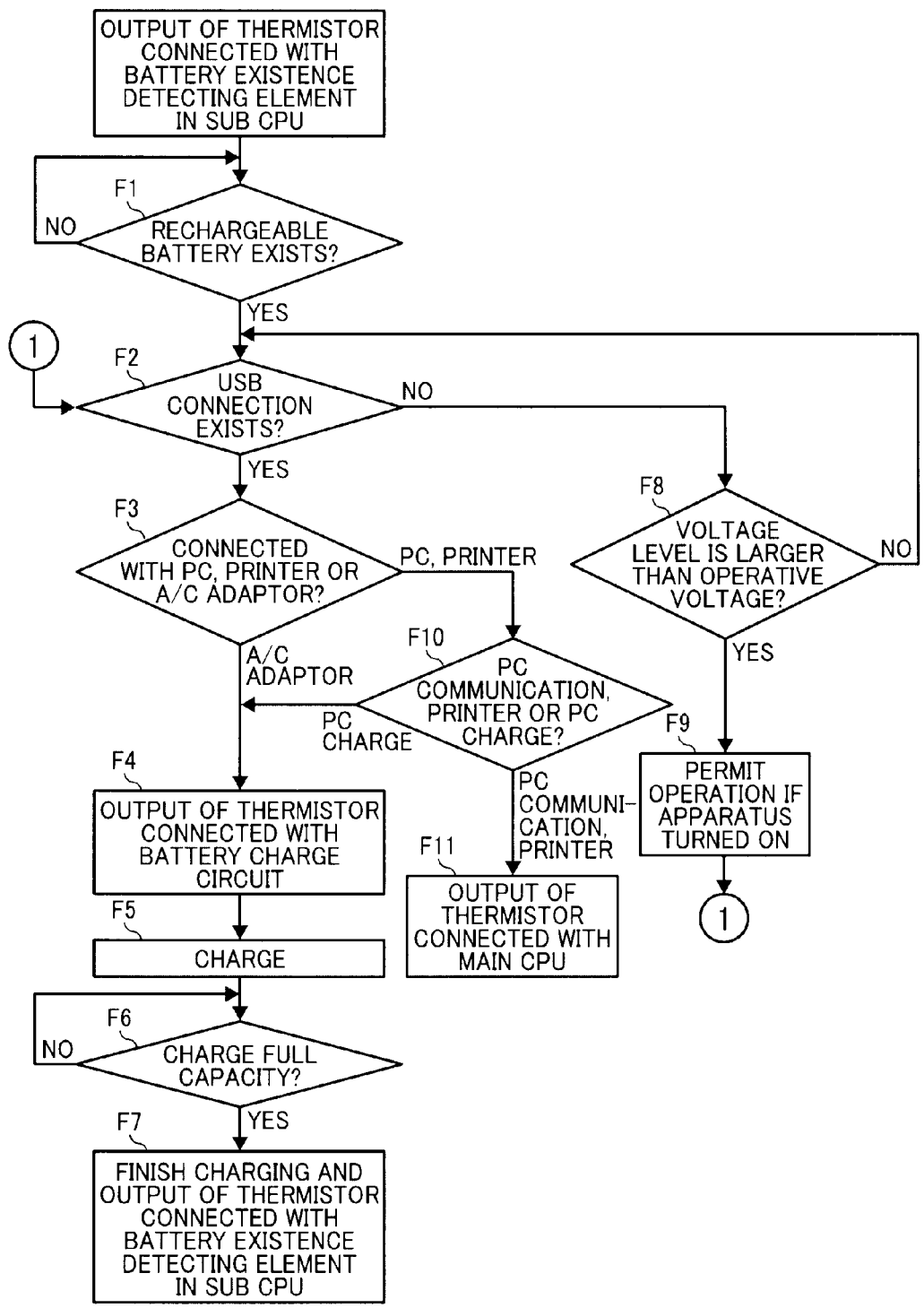
FIG. 3 is a flowchart illustrating switching procedure of the thermistor output of the rechargeable battery at the time of camera operation and charge operation.

FIG. 3 is a flowchart illustrating switching procedure of the thermistor output of the rechargeable battery at the time of camera operation and charge operation.

At the start of the flowchart, output of the thermistor 2 of the rechargeable battery 126 is connected to the battery existence detecting element of the sub CPU 109 by the switching unit for thermistor output 132.

The USB block 104-5 monitors whether the sub CPU 109 detects existence of the rechargeable battery 126 via the battery existence detecting element (step F1). When the existence of the rechargeable battery 126 is detected, the process proceeds to step F2.

The USB block 104-5 detects whether the USB connector 122 is connected with the A/C adaptor 122 or the USB BUS 130 via the USB connection detecting circuit (step F2). When detecting a connection of the USB connector 122, the process proceeds to step F3. When not detecting a connection of the USB connector 122, the process proceeds to step F8.

The USB block 104-5 determines whether the USB connector 122 is connected with the A/C adaptor 122 or the USB BUS 130 via the USB connection detecting circuit (step F3). When connected with the A/C adaptor 122, the process proceeds to step F4. When connected with the USB BUS 130, the process proceeds to step F10.

In case the A/C adaptor 129 is connected with the USB connector 122, the sub CPU 109 controls the switching unit for thermistor output 132. The terminal p1 is connected with the terminal p2 in the switch1 1321 and output of the thermistor 2 is connected with input terminal of the battery charge circuit 127 (step F4).

The battery charge circuit 127 starts charging. The power source from the A/C adaptor 129 is supplied to the power supply connector 104-5a via the USB connection detecting circuit 131 and the USB block 104-5 (step F5).

The battery charge circuit 127 performs charging until the rechargeable battery 126 is at full capacity (step F6). After the battery is at full capacity, the process proceeds to step F7. The plural comparators (three comparators in FIG. 2) C1, C2 and C3 compare the voltage of the temperature detecting voltage between the thermistor 2 and pull up resistance R1 with respective reference voltage and output charge status (step F6). Here, the image processing apparatus may be allowed to start operation during charging after the voltage of the rechargeable battery 126 becomes larger than a predetermined value. The predetermined value is lower than full capacity value and the image processing apparatus can start operation. Since the user does not need to wait until the battery reaches full capacity, the user has earlier access to the image processing apparatus.

The battery charge circuit 127 stops charging based on the charge status. The sub CPU 109 returns status of the switching unit for thermistor output 132 to initial status (step F7), which is that the terminal p1 is connected with the terminal p3 in the switch1 1321 and the terminal p3' is connected with the terminal p5 in the switch 2 1321. Therefore, the output of the thermistor 2 is connected with the battery existence detecting element in the sub CPU 109.

The battery level detecting circuit 128 checks voltage level of the rechargeable battery 126 (step F8). When the voltage level is larger than an operative voltage, the process proceeds to step F9. When the voltage level is smaller than the operative voltage, the process proceeds to step F2.

The sub CPU 109 allows operation of the camera processor 104 and the image processing apparatus (digital camera) is in operative state (step F9).

The sub CPU 109 checks whether there is a connection with a PC for communication, with a printer or a connection with a PC for a charging operation (step F10). When in a case of PC charging operation, the process proceeds to step F4. When in a case of PC communication or connection with a printer, the process proceeds to step F11.

The sub CPU 109 controls the switching unit for thermistor output 132 and the output of the thermistor 2 is connected with the camera processor 104 (step F11). At this time, the terminal p1 is connected with the terminal p3 in the switch1 1321 and the terminal p3' is connected with the terminal p4 in the switch2 1322.

According to the above embodiment, the battery charge circuit can be added easily on the conventional image processing apparatus which operates by the rechargeable battery. The embodiment performs not only charging referring temperature information from the thermistor of the rechargeable battery but also referring temperature information by the processor while the image processing apparatus operates and the battery is discharged.

Usually, when charging a rechargeable battery, controls which start charging and stop charging or which reduce charging current and voltage are performed based on the temperature information from a thermistor of the battery. When the apparatus operates by the rechargeable battery, if temperature of the apparatus becomes high, the power source of the apparatus is cut off to be safe.

In the above control, the thermistor is connected with pull up resistance and biased toward certain voltage. The voltage of the temperature detecting terminal between the thermistor and the pull up resistance is monitored. When the apparatus operates, the voltage of the temperature detecting terminal is monitored by CPU via A/D convertor. When charging, the voltage of the temperature detecting terminal is compared with reference voltage via comparator.

As above described, the pull up voltage is different according to the system. The reference voltage is different according to the battery charge circuit or battery charge IC. If the voltage of the temperature detecting terminal shifts because of above difference, it becomes impossible to guarantee normal operation.

According to the above embodiment, by adding the switching unit for thermistor output 132, the output of the thermistor 2 can be switched and can be set what detects temperature information. In other words, reliable operation can be realized by adding small components without considering above difference.

In the embodiment, at least part of process which each component performs is carried out by computer, alternatively. The program which performs the at least part of process in line with the flowchart of FIG. 3 can be saved and distributed by semiconductor memory, CDROM and magnetic tape such that computer can read. Computer which includes at least micro computer, personal computer and general purpose computer read out the program and execute it.

What is claimed is:

1. An image processing apparatus, comprising:
   a rechargeable battery that includes a temperature detecting terminal from which temperature status of the rechargeable battery is obtained;
   a connector that supplies electric power to charge the rechargeable battery;
   a battery charge unit that controls the electric power and charges the rechargeable battery via the connector;
   a control unit that controls the battery charge unit and operation of the image processing apparatus; and
   a switch unit that switches a connection of the temperature detecting terminal among the battery charge unit and the control unit,
   wherein
   the control unit controls the switch unit such that the temperature detecting terminal is connected with the battery charge unit in case of charging the rechargeable battery and the temperature detecting terminal is connected with the control unit in case of an image processing operation.

2. The image processing apparatus as claimed in claim 1, wherein
   the control unit includes a first control unit that detects being supplied with the electrical power and controls the switch unit and a second control unit that controls the image processing operation,
   the first control unit operates with a first power supply voltage and the second control unit operates with a second power supply voltage that is higher than the first power supply volatage, and
   the first control unit controls the switch unit such that the temperature detecting terminal is connected with the battery charge unit in case of charging the rechargeable battery, the temperature detecting terminal is connected with the second control unit in case of image processing operation and the temperature detecting terminal is connected with the first control unit in case of no charging operation and no image processing operation.

3. The image processing apparatus as claimed in claim 1, further comprising:
   a battery level detecting unit that detects a voltage level of the rechargeable battery,
   wherein
   in case of charging the rechargeable battery, the control unit controls the switch unit such that the temperature detecting terminal is connected with the battery charge unit and forbids the image processing operation unless the battery level detecting unit detects that the rechargeable battery is charged to full capacity, and
   when the battery level detecting unit detects that the battery is charged to full capacity, the control unit controls the switch unit such that the temperature detecting terminal is connected with the control unit and permits the image processing operation.

4. The image processing apparatus as claimed in claim 1, further comprising:
   a battery level detecting unit that detects a voltage level of the rechargeable battery,
   wherein
   the battery level detecting unit detects that the rechargeable battery is charged to a level ranging from full capacity to a first capacity that is lower than the full capacity, and
   the control unit permits image processing operation in response to the battery level detecting unit detecting that the rechargeable battery has a charge ranging from the first capacity to the full capacity.

5. The image processing apparatus as claimed in claim 1, further comprising:
   plural resistors, each of which has one terminal connected with a pull up voltage and another terminal connected with the temperature detecting terminal via the switch unit, respectively; and
   a thermistor that has one terminal connected with the temperature detecting terminal and another terminal connected with ground,
   wherein
   the control unit and the battery charge unit determine a temperature of the rechargeable battery according to the pull up voltage that is divided between one of the plural resistors and the thermistor.

6. The image processing apparatus as claimed in claim 1, wherein
   the switch unit comprises a semiconductor analog switch, and
   a power source of the switch unit includes a merger of at least two of power sources included in the image processing apparatus via diodes.

7. The image processing apparatus as claimed in claim 1, wherein
   the connector includes a USB interface.

8. A method comprising:
   controlling, with a control unit, a switch unit in an image processing apparatus that switches a connection of a temperature detecting terminal of a rechargeable battery among a battery charge unit that charges the rechargeable battery in the image processing apparatus and the control unit that controls the battery charge unit and operation of the image processing apparatus,
   wherein the controlling includes controlling the switch unit to connect the temperature detecting terminal with the battery charge unit in case of charging the rechargeable battery and controlling the switch unit to connect the temperature detecting terminal with the control unit in case of an image processing operation.

9. The method of claim 8, wherein
   the control unit includes a first control unit that detects being supplied with the electrical power and controls the switch unit and a second control unit that controls the image processing operation, and the method further comprises:
   operating the first control unit with a first power supply voltage;
   operating the second control unit with a second power supply voltage that is higher than the first power supply voltage; and
   controlling, with the first control unit, the switch unit such that the temperature detecting terminal is connected with the battery charge unit in case of charging the rechargeable battery, the temperature detecting terminal is connected with the second control unit in case of image processing operation and the temperature detecting terminal is connected with the first control unit in case of no charging operation and no image processing operation.

10. The method of claim 8, further comprising,
    detecting a voltage level of the rechargeable battery;
    in case of charging the rechargeable battery, controlling, with the control unit, the switch unit such that the temperature detecting terminal is connected with the battery charge unit and forbidding the image processing operation unless the detecting detects that the rechargeable battery is charged to full capacity; and when the battery level detecting unit detects that the battery is charged to full capacity, controlling, with the control unit, the switch unit such that the temperature detecting terminal is connected with the control unit and permitting the image processing operation.

11. The method of claim 8, further comprising, detecting that the rechargeable battery is charged to a level ranging from full capacity to a first capacity that is lower than the full capacity, and enabling, with the control unit, the image processing operation in response to the rechargeable battery having a charge ranging from the first capacity to the full capacity.

12. The method of claim 8, further comprising:

determining, with the control unit and the battery charge unit, a temperature of the rechargeable battery according to a pull up voltage that is divided between a resistor and a thermistor.

\* \* \* \* \*